April 5, 1966     C. W. GUY     3,244,106

HIGH PRESSURE PUMPING DEVICE

Filed Sept. 30, 1963

INVENTOR.
CHARLES W. GUY
BY
Donald W. Graves
ATTORNEY

United States Patent Office 3,244,106
Patented Apr. 5, 1966

3,244,106
HIGH PRESSURE PUMPING DEVICE
Charles W. Guy, Northridge, Calif., assignor to North American Aviation, Inc.
Filed Sept. 30, 1963, Ser. No. 312,570
2 Claims. (Cl. 103—5)

This invention relates to pumping devices.

More particularly, this invention relates to a system for compressing gas to a high pressure.

Many devices are known in the art for pumping fluids. These include displacement pumps which are either pistonless, rotary, steam or reciprocating, and the centrifugal pump which includes the radial flow, mixed flow and axial flow. For greater capacity, several stages may be provided.

When it is desirable to highly pressurize a gas, and there are more than 200 industrial uses for pressurized gas, it is common practice to use a compressor. The compressor is typically of the positive displacement type and as a general rule is either reciprocating or rotary although other types are known in the art. Of the two types, the piston type or reciprocating compressor is most commonly used for high discharge pressures in the neighborhood of 100 p.s.i. and fairly high flow rates. Centrifugal compressors are also widely used and are advantageous for high flow rates. For very high pressures, particularly for third and fourth stage compressions, cylinders of the single action plunger type are commonly used. Compressors are typically driven by steam, internal combustion engines or electric motors.

For high pressure applications, individual compressor units or stages are provided in a series relationship. This can be done for both liquid, which is pressurized rather than compressed, or gas which is the more common working medium. However, when extremely high pressures are needed, problems are encountered in the design and construction of compressor and pump structures. In the area of seals, centrifugal compressors in particular require simple dependable seals to preclude excessive gas flow to the atmosphere, providing shutdown protection when needed, and minimizing power losses. However, any of these types when high pressures are necessary present problems in design and construction throughout the compressor, including the housing structure. Thus, the walls of the housing structure may be of necessity quite thick, necessitating a unit which is heavy, bulky and expensive.

In one form, this invention is directed to a multi-stage compression system in which one or more of the compressor units are housed in a pressure vessel, the interior of which is pressurized by a previous compressor so that the intake of the compressor is located in the pressure vessel. This minimizes the pressure drop across the compressor inlet since the compressor is exposed to a higher ambient pressure which would be equal to the previous stage discharge pressure. In another form, this invention is directed to a multistage compression system in which one or more of the compressor units are housed in a pressure vessel, the interior of which is pressurized by the compressor unit outlet so that there is essentially no pressure drop across the compressor outlet. In still another form, liquid pumps are housed within pressure vessels for the pressurization of liquids.

An object of this invention is to provide a new multi-stage pumping system.

Other objects and advantages of this invention will become apparent as this description proceeds taken in conjunction with the drawings in which.

Figure 1:
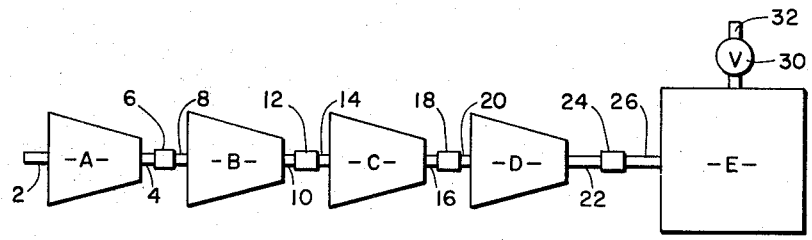
FIG. 1 is a schematic view of a typical prior art compressor system.

Referring now to FIG. 1, there is shown a schematic view of a typical compressor system. Basically, this system includes a compressor unit A with inlet 2 and outlet 4. Compressor unit B receives pressure from compressor A through connection 6 and inlet 8. Likewise, compressor unit C receives a discharge pressure from unit B through outlet 10, connecting member 12 and inlet 14 and discharges the pressurized fluid through outlet 16 which passes through connecting member 18 and inlet 20 of compressor unit D. The final compression takes place in unit D which transfers the gas through conduit 22, connecting member 24 and inlet 26 of pressurizing or storage tank E. Pressure tank E is illustrated as a collecting medium for the pressurized gas and thus may act as a storage vessel for future use. When it is desired to release the gas, a valve 30 is provided which will allow the gas to escape through outlet 32 to the desired area. Pressure vessel E may be eliminated when the gas is used directly. For illustration purposes, each of the units A, B, C and D are described as gas compressor units with a 4 to 1 compression ratio. That is, the gas that enters the intake of each of the units is compressed by the compressor to a pressure ratio of 4 to 1. These units may be driven by any of the aforementioned common means and for purposes of clarity such means are not shown. However, a convenient prime mover would be an electric motor located on the compressor unit. As a numerical example, assuming that it is desired to pressurize air at an ambient pressure of approximately 15 p.s.i., unit A will compress this to a pressure of 60 p.s.i. Unit B will receive the gas at 60 p.s.i. and compress this to 240 p.s.i. which is then fed into compressing unit C which compresses it to 960 p.s.i. The gas is then fed into unit D wherein the ultimate pressure of 3,840 p.s.i. is achieved. The gas is then stored in pressure vessel E for ultimate use as desired at a pressure of 3,840 p.s.i.

Figure 2:
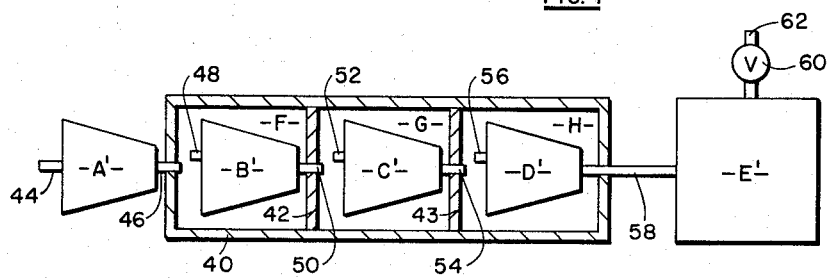
FIG. 2 is a schematic view illustrating a compressor system according to one form of this invention.

Illustrated in FIG. 2 is a schematic view of one embodiment of this invention and for simplicity is arranged to correspond to the prior art illustrated in FIG. 1 for easy reference. Thus, a compressor A', B', C', D' and pressure vessel E' are shown corresponding to compressors A, B, C, D and pressure vessel E. Shown generally at 40 is a pressure vessel which is divided into compartments F, G and H in which compressors B', C' and D' are respectively situated. By means of walls 42 and 43 the compartments are separated from each other and are hermetically sealed with respect to the outside atmosphere and the adjacent compartment by means well known such as welding. As in the structure shown in FIG. 1, gas enters inlet 44 of compressor A' at 15 p.s.i. and through outlet 46 into compartment F at a pressure of 60 p.s.i. assuming a 4 to 1 compression ratio in compressor A'. Compressor B' then compresses the 60 p.s.i. pressure to 240 p.s.i. through inlet 48 and feeds the pressurized gas into compartment G through outlet 50. This pressure would then be at a pressure of 240 p.s.i. which provides the ambient pressure for compressor B'. The gas enters inlet 52 of compressor B which pressurizes this to a pressure of 960 p.s.i. which is then discharged into tank or compartment H through outlet 54. The final compression takes place in compression unit D' through inlet 56 and the gas discharged through discharge 58 at an ultimate pressure of 3,840 p.s.i. Pressure or storage vessel E' is provided along with valve 60 and outlet 62 similar to that shown in FIG. 1.

Figure 3:
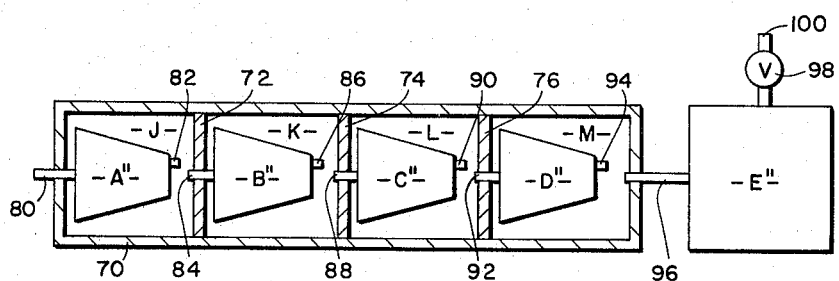
FIG. 3 is a schematic view illustrating a compressor system according to another form of this invention.

In FIG. 3, another embodiment of this invention is disclosed in schematic form and for convenience is shown as corresponding to FIG. 1 and FIG. 2. Thus, compressor units A″, B″, C″ and D″ are shown along with pressure vessel E″. Pressure vesssel 70 divided into compartments J, K, L and M into which compressors A″, B″, C″ and D″ are respectively located. Pressure vessel 70 is divided into the respective compartments by walls 72, 74 and 76 which hermetically seal the compartments with respect to each other and to the atmosphere.

Gas enters compressor A″ by means of inlet 80 at 15 p.s.i. and into compartment J by means of outlet 82 at a pressure of 60 p.s.i. Compressor B″ receives the 60 p.s.i. gas through inlet 84 which extends through wall 72 and as in the previous embodiments is sealed relative thereto. Compressor B″ compresses the gas to 240 p.s.i. and discharges the gas into compartment or vessel K through outlet 86, which gas then becomes pressurized to 240 p.s.i. Compressor C″ receives the gas through inlet 88, compresses it to 960 p.s.i. and discharges the gas to compartment L through outlet 90 which is pressurized to 960 p.s.i. Finally D″, receiving the gas at 960 p.s.i. pressurizes or compresses the gas through inlet 92 and discharges the gas into tank M at a pressure of 3,840 p.s.i. through outlet 94. Storage tank E″ is provided with inlet 96, valve 98 and outlet 100 similar to the previous embodiments.

The following table gives a comparison of various pressures and pressure drops between the prior art system as shown in FIG. 1, the compressor system according to FIG. 2 and the compressor system according to FIG. 3.

TABLE

| Pressure at Compressor Inlet in p.s.i. | | | | | | | |
|---|---|---|---|---|---|---|---|
| A | 15 | B | 60 | C | 240 | D | 960 |
| A′ | 15 | B′ | 60 | C′ | 240 | D′ | 960 |
| A″ | 15 | B″ | 60 | C″ | 240 | D″ | 960 |

| Compression Ratio | | | | | | | |
|---|---|---|---|---|---|---|---|
| A | 4:1 | B | 4:1 | C | 4:1 | D | 4:1 |
| A′ | 4:1 | B′ | 4:1 | C′ | 4:1 | D′ | 4:1 |
| A″ | 4:1 | B″ | 4:1 | C″ | 4:1 | D″ | 4:1 |

| Pressure at Compressor Discharge in p.s.i. | | | | | | | |
|---|---|---|---|---|---|---|---|
| A | 60 | B | 240 | C | 960 | D | 3,840 |
| A′ | 60 | B′ | 240 | C′ | 960 | D′ | 3,840 |
| A″ | 60 | B″ | 240 | C″ | 960 | D″ | 3,840 |

| Ambient Pressure Outside Compressor in p.s.i. | | | | | | | |
|---|---|---|---|---|---|---|---|
| A | 15 | B | 15 | C | 15 | D | 15 |
| A′ | 15 | B′ | 60 | C′ | 240 | D′ | 960 |
| A″ | 60 | B″ | 240 | C″ | 960 | D″ | 3,840 |

| Pressure Drop Across Compressor Outlet in p.s.i. | | | | | | | |
|---|---|---|---|---|---|---|---|
| A | 45 | B | 225 | C | 945 | D | 3,825 |
| A′ | 45 | B′ | 180 | C′ | 720 | D′ | 2,880 |
| A″ | 0 | B″ | 0 | C″ | 0 | D″ | 0 |

| Pressure Drop Across Compressor Inlet in p.s.i. | | | | | | | |
|---|---|---|---|---|---|---|---|
| A | 0 | B | 45 | C | 225 | D | 945 |
| A′ | 0 | B′ | 0 | C′ | 0 | D′ | 0 |
| A″ | 45 | B″ | 180 | C″ | 720 | D″ | 2,880 |

From a comparison of the above table, it can be seen that the pressure drop across the compressor outlets with the exception of compressors A and A′ is appreciably smaller in the embodiment shown in FIG. 2 as compared with the prior art structure of FIG. 1. The embodiment shown in FIG. 3 displays an even more impressive decrease in pressure across the outlets. As the number of stages increase, it can be seen that the magnitude of the pressure drop becomes quite large. Thus compressor D′ has a maximum pressure drop of 2,880 p.s.i. at the outlet as compared with the pressure drop between the interior of compressor D and the ambient of 3,825. This is a difference of almost 1,000 p.s.i. This allows compressor unit D′ to be lighter in weight than compressor D and also presents advantages in seal designs. In the case of compressor D″, the difference is even more impressive, amounting to 3,825 p.s.i. Since a compressor, particularly one with a high compression ratio and high flow rate is of necessity a large and expensive unit, the use of the pressure vessel, which can be formed of comparatively thin walls, provides a cost savings. This is not to say that the total amount of metal used in the system might be cut down (since the pressure vessels are added) but the advantages in the actual compressor construction are apparent. Since pressure vessels 40 and 70 contain no moving parts and are merely enclosures under interior pressure, they are relatively easy to fabricate. In this connection, even though the ultimate pressure achieved is 3,840 p.s.i., it should be noted that the maximum pressure drop across pressure vessel 40 is only 945 p.s.i.

For any given application, the designer can choose between the embodiments shown in FIG. 2 and FIG. 3. For example, where a problem exists in sealing the inlets of each compressor, the embodiment shown in FIG. 2 would be advantageous since the pressure drop is essentially zero across each tank. On the other hand, where the problem arises at the discharge side, the embodiment shown in FIG. 3 would be chosen. Also, the system can be chosen to guard against either crushing (compression) or bursting (tension). The system of FIG. 2, for example, subjects the compressors to bursting stresses while the compressors in FIG. 3 are subjected to crushing stresses. The systems can also be combined so that each compressor can be housed to either show a minimum pressure drop across the inlet or the outlet with the next stage arranged in the opposite manner.

Figure 4:
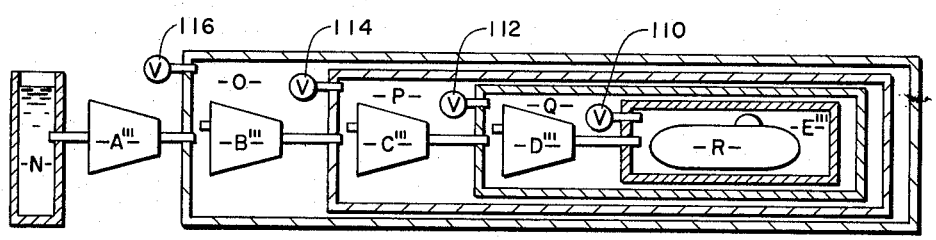
FIG. 4 is a schematic view illustrating a pumping system according to still another form of this invention.

The structure according to this invention also has application where it is necessary to pump and store liquid under high pressure as contrasted with gas. Since liquid is incompressible for the most part the system could utilize accumulators or a secondary gas pressure source within the pressure vessels to accommodate the incompressibility characteristics of liquids. However, a desirable system is illustrated in FIG. 4 where another embodiment of this invention is shown which has particular application in liquid pressurization. For example, when it is necessary to test a submersible vehicle, it is impractical to take the vehicle out to sea and submerge it to a great depth. Accordingly, it is desirable to have some means to pressurize the shell of such a vehicle without resorting to submergence at sea.

However, to subject the vessel to the extreme pressures encountered at great depths, which may surpass 20,000 p.s.i., it is necessary that pressure vessels of tremendous weight due to extreme wall thickness be fabricated. This causes problems in transportation and fabrication of the huge sections. This embodiment provides a solution to these problems.

Instead of compressors, although this embodiment could be utilized in gas applications, liquid pumps A‴, B‴, C‴, and D‴ are shown in FIG. 4. For purposes of simplicity, the stages of pressurization are described as being of equal increments rather than in compression ratios since liquids are incompressible.

Shown generally at N is a source of liquid such as water, which is pumped by pump A‴ into tank O until the liquid attains a pressure of 5,000 p.s.i Tank O, being closed, is built to withstand this pressure. Pump B‴, taking as a source the pressurized liquid will pressurize tank P to 10,000 p.s.i. Likewise, pump C‴ will pressurize tank Q to 15,000 p.s.i. and pump D‴ will pressurize tank E‴ to the ultimate pressure of 20,000 p.s.i. It should be noted that tank E‴ is located wholly within tank Q, tank Q is within tank P and tank P within tank O.

With the construction shown in FIG. 4, not only is the pressure drop across each pump limited to 5,000 p.s.i., but the pressure drop across each tank is limited to 5,000 p.s.i. As stated previously, instead of building one tank capable of withstanding the total pressure achieved, it is possible to construct a series of contained tanks of much smaller wall thickness. This not only facilitates transportation since each tank may be separately moved, but considerably eases the problems of fabricating a tank having extremely thick walls. In addition, the design and construction of each pump is much easier.

Although not shown, it is preferable that each of the tanks have closure means at one end so that, for example, tank P can be fitted within tank O or removed at will. Likewise, tank Q would be telescoped or slid into tank P and tank E''' within tank Q. Likewise, vessel R can be removed from tank E''' and the various pump units be removable from their associated tanks.

Although not necessary, it is desirable that pressure vent means 110 be provided to allow pressures in excess of 20,000 p.s.i. in tank E''' to be vented to tank Q. Thus, in the event that pressure within tank E''' exceeds the desired limit, vent valve 110 will relieve the pressure into tank Q. Although greater loses would occur, vent valve 110 could vent to the exterior of tank O. In the same manner, vent valves 112, 114 and 116 are provided to limit the pressure within their respective tanks to the desired maximum.

With the above described structure, it can be seen that vessel R can be subjected to extremely high pressures without the necessity of providing bulky pressure vessels and pumps.

While the invention has been shown as a four stage pumping system, it is obvious to those skilled in the art that any number of stages can be used embodying the novel features of this invention. Also, while a 4 to 1 compression ratio in each stage (FIG. 2 and FIG. 3) has been described, it is within the scope of this invention to vary the compression ratios and the beginning and ending pressure of the system. Furthermore, the two systems can be combined without departing from the scope of this invention. In FIG. 4, other pressures can, of course, be used as well as varying the number of stages and the particular configuration of the pressure vessels.

Thus, it can be seen that by this invention a relatively simple arrangement of compressors, pumps and pressure vessels results in which a compressor or pump unit can be built to withstand only the operating capability of the unit itself rather than having to withstand the high pressure drop between the interior of the compressing or pumping unit and the beginning ambient pressure which is the case in prior art examples. By the provision of a pressure vessel, which is separate from the compressor or pump unit, and placing the compressor or pump unit inside the pressure vessel, strength problems of the compressor or pump itself are substantially obviated. More important, in many examples the problems of designing seals to withstand the relatively high pressure drop is a much simpler task. Another advantage of the instant structure resides in the flexibility of the assembly. If a certain compression or pumping stage is desired, a number of units can be selected to satisfy the requirements and the proper number of pressure vessels utilized. It is therefore not necessary to have a compressor or pumping unit capable of withstanding the ultimate pressure realized through the multi-staged system. Although not shown, it is within the scope of this invention and in fact preferable that each of the pressure vessels have means whereby the compressor or pump can be either serviced or removed from within the pressure vessel. This can be readily accomplished by the provision of hatches or doors on the pressure vessels. Furthermore, it is within the scope of this invention to provide that the pressure vessels be of any desired shape. One of the more desirable shapes would be a sphere in which case the sphere would be formed of two halves which are secured together by any means well-known in the art.

While specific embodiments have been shown of this invention, it is to be understood that the embodiments are merely by way of illustration and not limitation, as various other forms will of course become apparent to those skilled in the art without departing from the spirit of the invention or the scope of the claims appended hereto.

I claim:
1. A pumping assembly for fluids comprising:
first pump means having an outlet,
first tank means adapted to receive fluid from the outlet of said first pump means and to contain said fluid under pressure,
second pump means located within said first tank means and having an outlet,
second tank means located within said first tank means and adapted to receive fluid from the outlet of said second pump means and to contain said fluid under pressure.

2. A system for pressurizing a fluid comprising:
a first pump having an inlet and an outlet,
a first tank, said pump outlet extending into a wall of said first tank,
a second pump in said first tank having an inlet within said first tank and an outlet extending through a wall of said first tank,
a second tank,
the outlet of said second pump extending into said second tank through a wall thereof,
a third pump in said second tank having an inlet and an outlet, said inlet being located within said second tank and an outlet extending to the exterior of said second tank,
each of said pumps having motor means independent of the motor means of the other pumps.

References Cited by the Examiner
UNITED STATES PATENTS

| | | | |
|---|---|---|---|
| 1,439,386 | 12/1922 | Warman | 103—108 |
| 1,531,607 | 3/1925 | Green | 103—5 |
| 2,887,958 | 5/1959 | Davidson | 103—115 X |

DONLEY J. STOCKING, *Primary Examiner.*

LAURENCE V. EFNER, *Examiner.*